United States Patent [19]
Thomason

[11] Patent Number: 5,339,956
[45] Date of Patent: Aug. 23, 1994

[54] TOOL BOX WITH COMBINED ELEMENTS

[76] Inventor: Raymon Thomason, 3415 Danbury, Amarillo, Tex. 79109

[21] Appl. No.: 83,342

[22] Filed: Jun. 28, 1993

[51] Int. Cl.[5] .............................................. B65D 85/28
[52] U.S. Cl. .................................... 206/372; 206/373; 206/328; 242/395.1
[58] Field of Search ............... 206/328, 349, 372, 373, 206/408; 242/85, 96

[56] References Cited

U.S. PATENT DOCUMENTS

| | | | |
|---|---|---|---|
| 2,245,892 | 6/1941 | Anschicks et al. | 206/372 |
| 3,371,975 | 3/1968 | Meltzer | 206/328 |
| 3,707,268 | 12/1972 | Kelly | 242/85 |
| 4,282,954 | 8/1981 | Hill | 242/96 |
| 4,356,916 | 11/1982 | Anglemyer | 206/372 |
| 4,557,430 | 12/1985 | Bonhard | 242/96 |
| 4,611,713 | 9/1986 | Byrns | 206/372 |
| 4,685,634 | 8/1987 | Schwartz | 242/96 |
| 5,011,013 | 4/1991 | Meisner et al. | 206/573 |

FOREIGN PATENT DOCUMENTS

| | | | |
|---|---|---|---|
| 6434876 | 2/1989 | Japan | 242/85 |
| 1077062 | 7/1967 | United Kingdom | 206/373 |

*Primary Examiner*—David T. Fidei
*Attorney, Agent, or Firm*—Dougherty, Hessin, Beavers & Gilbert

[57] ABSTRACT

A tool box combined with an electrical extension cord and other amenities consisting of a tool box having bottom compartment and lid with one corner of the compartment housing an extensible electrical cord and plug which is electrically connected to a plural receptacle source connection housed in the tool box compartment. Additional combinative features, e.g., cup holders, are also included.

9 Claims, 4 Drawing Sheets

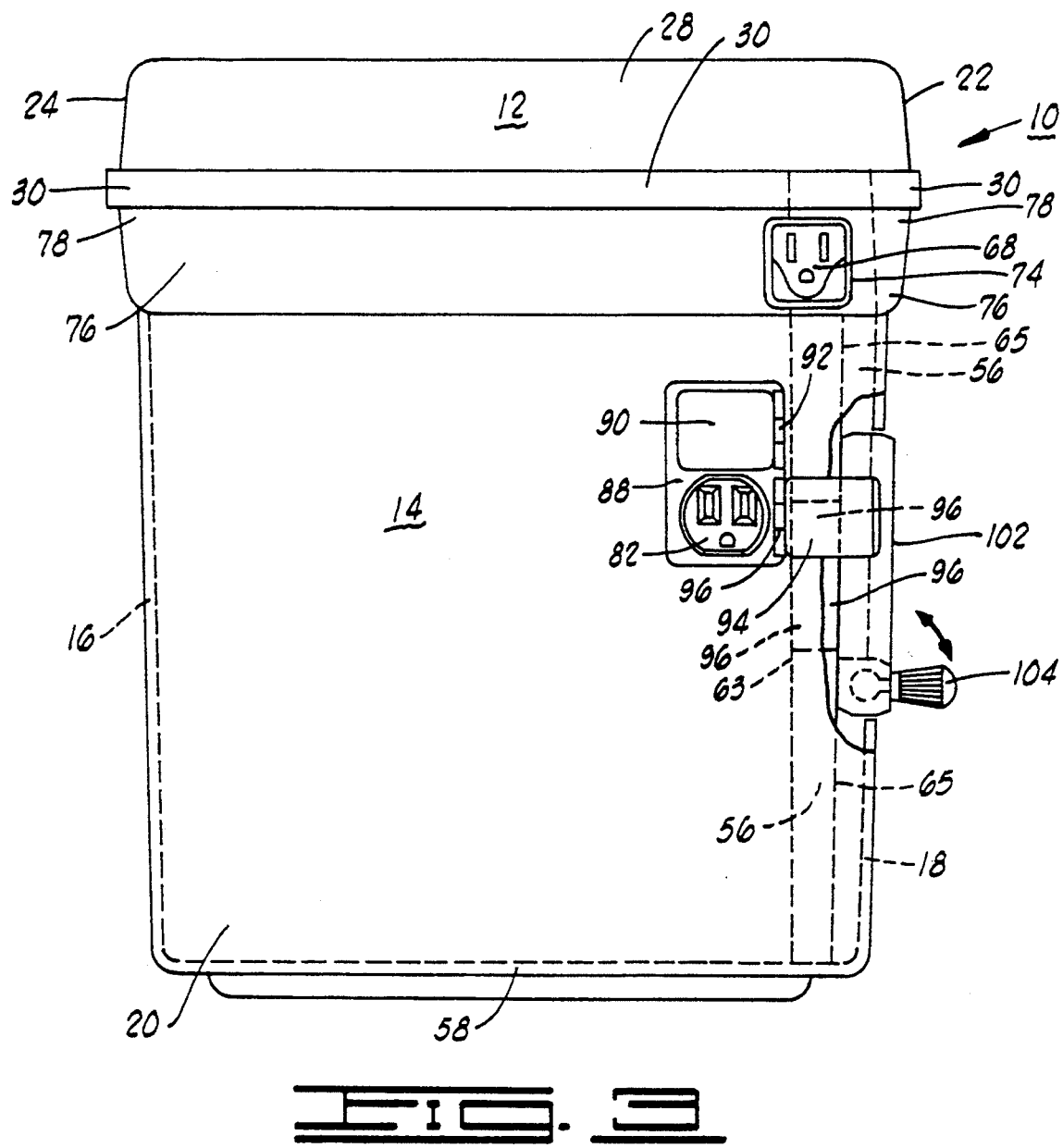

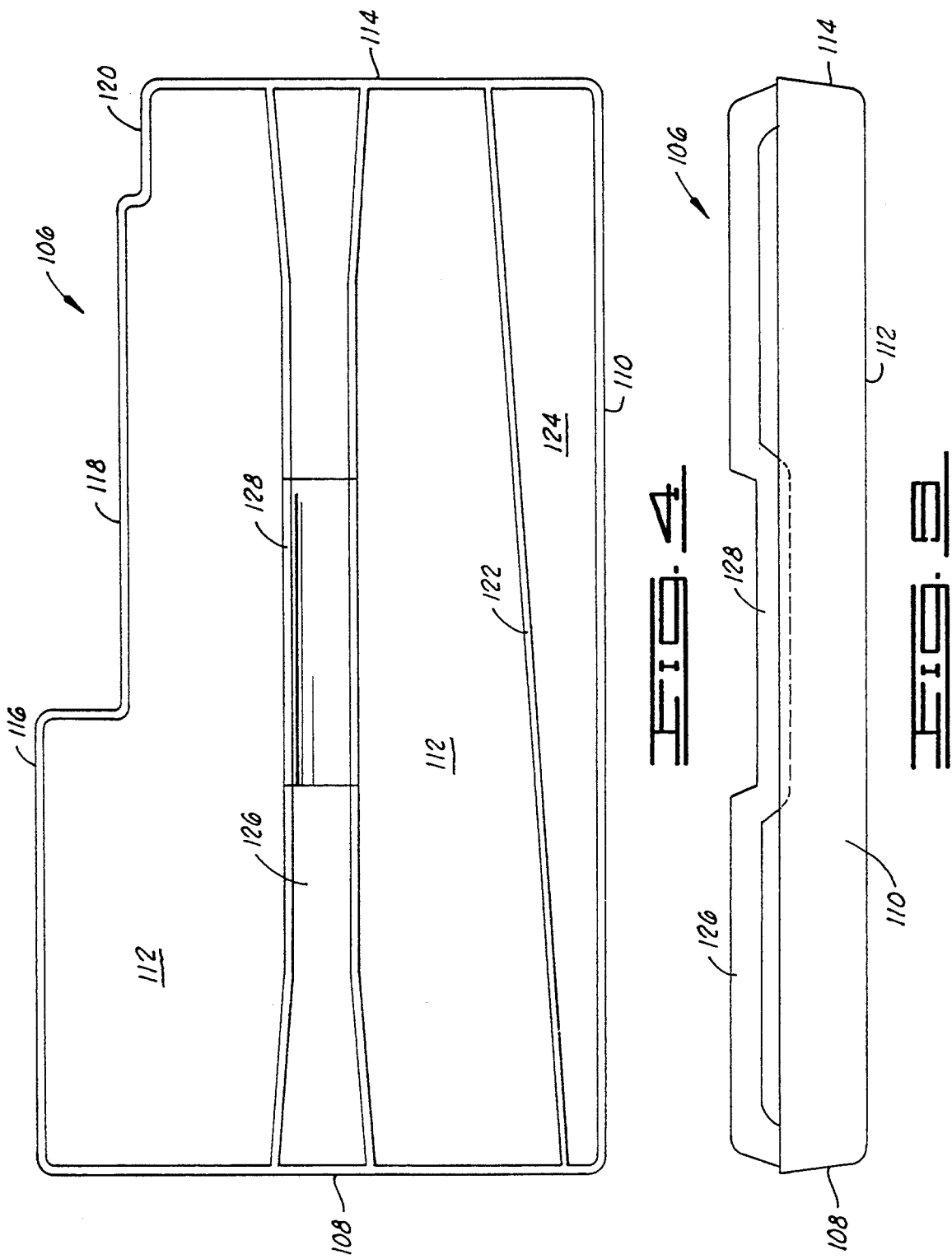

TOOL BOX WITH COMBINED ELEMENTS

BACKGROUND OF THE INVENTION

1. Field of the Invention

The invention relates generally to hand tool boxes and, more particularly, but not by way of limitation, it relates to an improved form of tool box that includes elements in combination such as, for example, an extensible electrical cord.

2. Description of the Prior Art

The inventor is well aware of many different types and sizes of tool box for containing hand tools and many different styles, shapes and sizes have been developed and used over a long number of years. The inventor is not aware, however, of any form of tool box that is constructed to include in combination an electrical extension cord that is retractably wound within a compartment portion of the tool box. Also, the tool box embodies other combinative features including measuring scales, cup holders and the like which contribute a still greater versatility to the tool box assembly.

SUMMARY OF THE INVENTION

The present invention relates to improvements in manual tool boxes, which improvements are largely directed to the inclusion of selected combinative features that enable a multiple of advantageous functions. The tool box consists of the usual bottom container portion with hinged lid which may be latched closed and locked. The bottom or container portion is compartmented to include an electrical extension cord that is stored on a reel for retractable withdrawal from the tool box to an electrical outlet in the proximity whereupon the tool box also then serves as an extension source of electrical power for electrical tools used at the site. The tool box lid also includes multiple bossed measuring scales as well as round indentations for receiving cups or bottles that may be accessible at the work site. The tool box also is adapted to include a storage tray for retention within the tool box bottom section in non-interfering position relative to the top lid during closure.

Therefore, it is an object of the present invention to provide a tool box that also carries an extension electrical outlet.

It is also an object of the present invention to provide a tool box that is relatively compact and light in weight while providing an extensible electrical cord as well as appreciable tool storage space.

It is yet further an object of the invention to provide a tool box that includes measuring and cup holding amenities thereon.

Finally, it is an object of the present invention to provide a tool box offering a plurality of combinative features that is relatively rugged in use and easy to manufacture.

Other objects and advantages of the invention will be evident from the following detailed description when read in conjunction with the accompanying drawings which illustrate the invention.

BRIEF DESCRIPTION OF THE DRAWINGS

FIG. 3 is an end view of the tool box in elevation;

FIG. 4 is a top plan view of a removable tray constructed in accordance with the present invention; and FIG. 5 is a side view in elevation of the removable tray of FIG. 4.

DETAILED DESCRIPTION OF THE INVENTION

Figure 1:
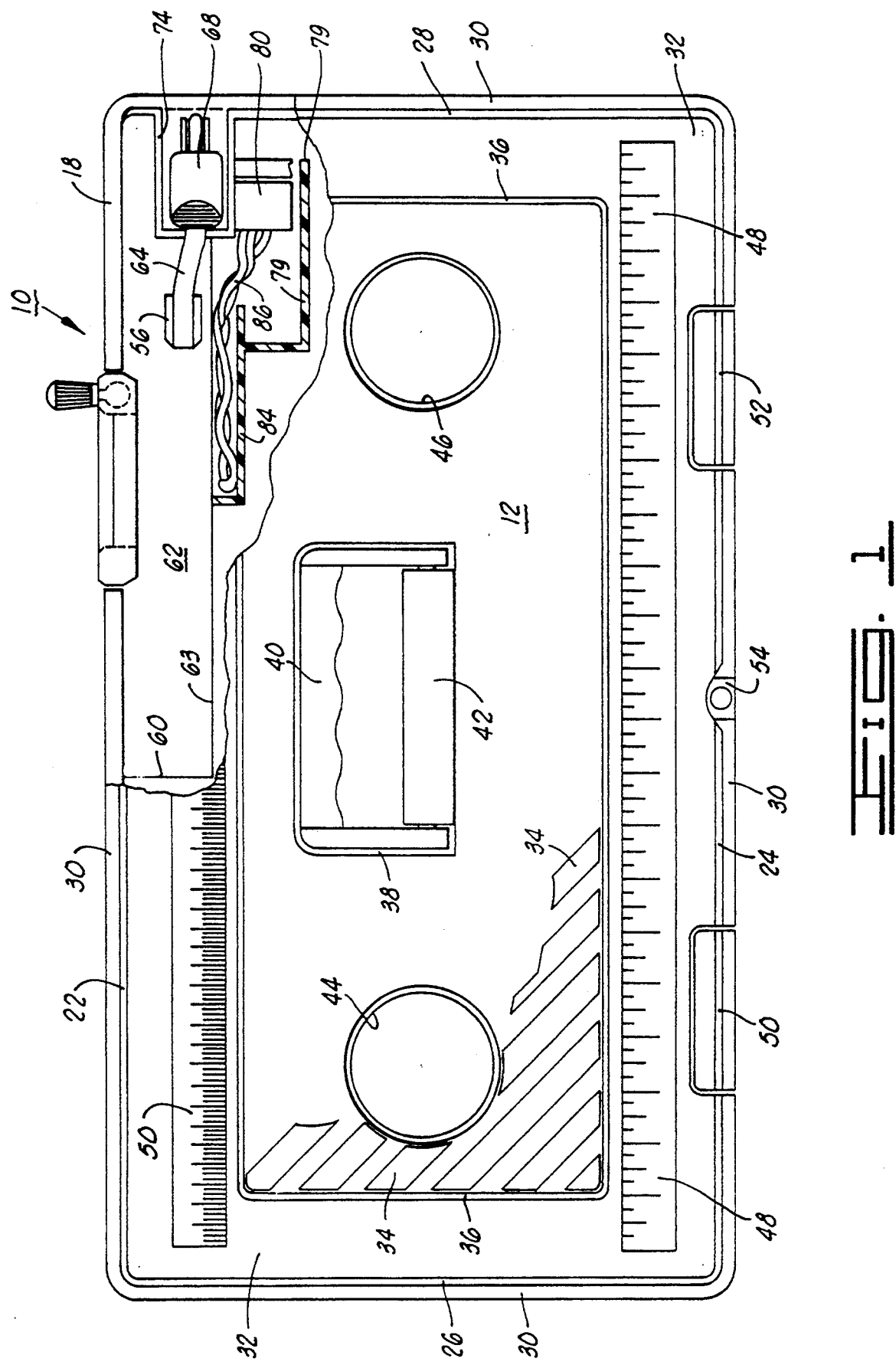
FIG. 1 is a top plan view of a tool box constructed in accordance with the present invention.
Figure 2:
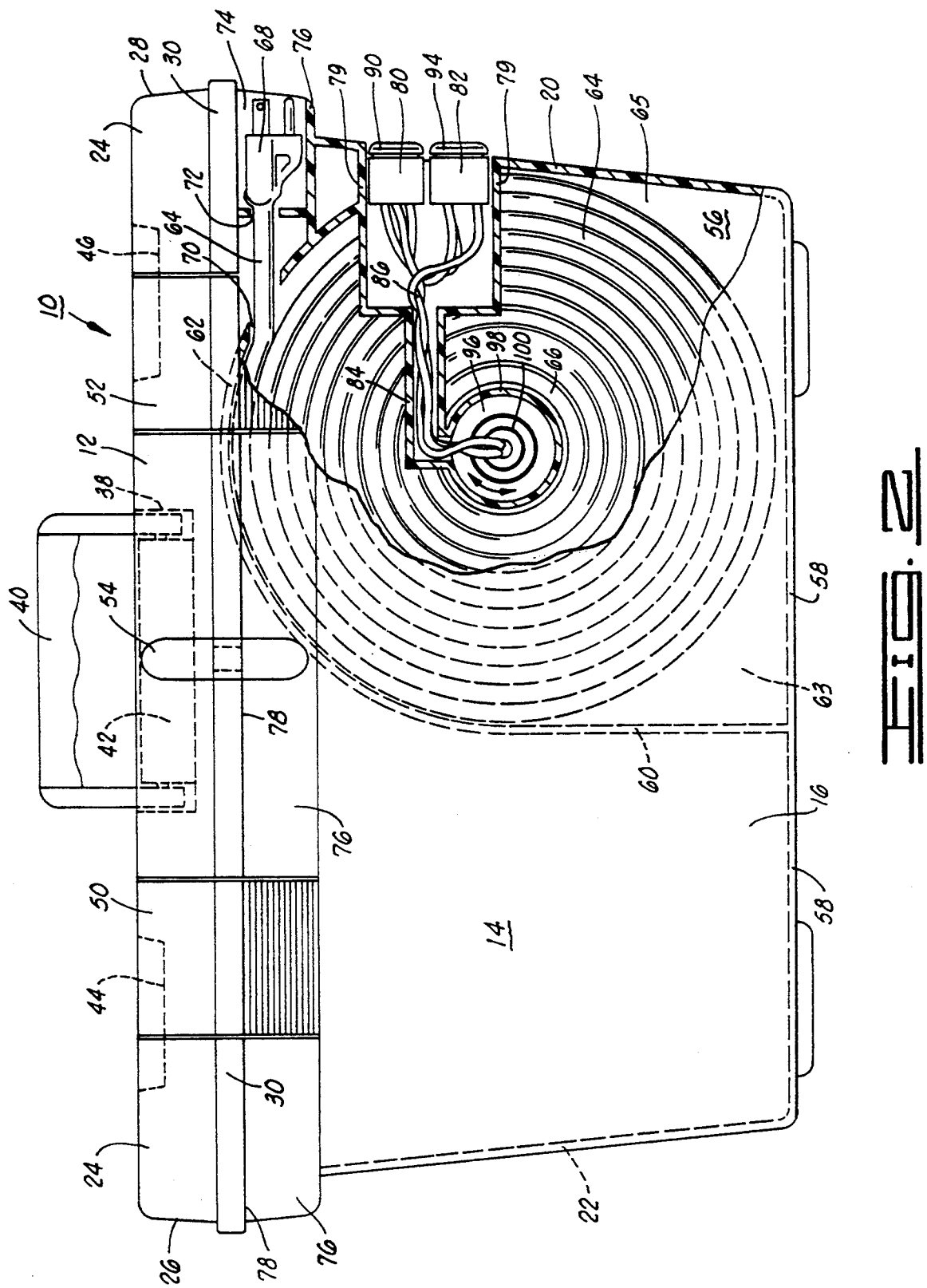
FIG. 2 is a side view in elevation of the tool box with internal components shown in cut-away.

As shown in FIGS. 1, 2 and 3, a tool box 10 includes a top or lid 12 (FIG. 1) as well as a bottom portion 14 (FIG. 2) having side walls 16 and 18 and end walls 20 and 22 (FIG. 3).

The lid 12 is constructed with shallow side walls 22 and 24 and opposite end walls 26 and 28 as formed with a sealing lip 30 for enclosure down over the underlying structure, as will be described. The lid side walls 22, 24 and end walls 26, 28 are unitarily formed with an upper panel 32 which is essentially flat but has such as decorative stiffening ridges 34 molded in a pre-set pattern within a generally central area outlined by boundary molding 36. Also included within molding 36 is a generally central recess 38 having a handle 40 retractably set therein as pivotally secured within a pivot mounting 42. A pair of circular cup-holder indentations 44 and 46 are then formed in equal disposition on each side of handle recess 38.

The lid 12 also includes a ruler configuration 48 as debossed or molded therein to provide inches measurement. A similar ruler outline 50 is disposed on the opposite side of lid 12 to provide a metric measuring scale. Recessed, hinged latches 50 and 52 of standard type provide secure closure of the lid 12 and bottom 14, and a suitable hasp fixture 54 allows secure padlocking of the tool box.

Referring to FIGS. 1 and 2, the tool box 10 is adapted to include an internal compartment 56 disposed at one corner of the bottom 14. The compartment 56 is formed with a bottom panel coincident with panel 58 of bottom 14, an end panel 60 terminating in upper curvature 62 and a longitudinal interior panel 63 (see FIG. 1). The opposite end of compartment 56 is formed contiguous with tool box end wall 20 thereby defining what is essentially a generally squared narrow compartment 56. An intermediate panel 65 provides confinement for the extension cord, in effect giving an aligned stacking of the coiled cord layers (see FIG. 3).

The compartment 56 is a housing for a reel of extension cord 64 as supported on hub 66 (as will be described) and terminating in three-prong plug 68. The hub 66 is rotatably supported between panel 65 and compartment panel 63 (to be described) as the electric cord 64 is led through a slot 70 formed in rounded top 62 of compartment 56. A second guide slot 72 formed adjacent the compartment slot 70 serves both as a passage for electric cord 64 and a stop member for retraction of cord 64 and plug 68. A recess 74 is formed around guide slot 72 in end panel 20 thereby to provide a storage housing for the retracted electric plug 68.

An expanded upper shoulder 76 is formed around the upper peripheral extremities of bottom portion 14 of tool box 10. The upper shoulder 76 provides decoratively recessed seating of the latches 50 and 52 and lower portion of hasp 54 while also providing an upper comb or rim 78 that is tightly received up within sealing lip 30 of lid 12 during closure. The upper shoulder 76 also includes the plug recess 74 molded therein at the selected corner position.

A second recess 79 is molded within box bottom section 14 at end panel 20 for the purpose of housing an array of female A-C plugs 80, 82. Plugs 80 and 82 are arrayed in over/under positioning as they are suitably retained by spring-lock fasteners or the like to face outward from end wall 20 thereby to provide electrical connection for hand tools, drop lights and the like. As shown in FIG. 1, the cavity 79 is formed adjacent to and inboard of the extension cord storage compartment 56. A second conduit or channel 84 is molded between vertical wall 63 and recess 79 (see FIG. 1) and provides for passage of the A-C and ground wires 86 which lead out from extension cord compartment 56 to each of receptacles 80, 82. A plurality of receptacles greater than two may be provided if necessary.

Referring also to FIG. 3, the three-prong receptacles 80, 82 are secured within a frame 88 which provides protection for the integrity of the electrical receptacles 80, 82. A spring closure cap 90 and hinge 92 provide cover for the upper receptacle 80 while a lower cap 94 (shown open) affixed to spring hinge 96 closes over the lower receptacle 82.

The A-C wires 86 from receptacles 80 and 82 (FIG. 2) lead back through compartment 79 to a generally cylindrical conduit 84 where the individual wires are connected into a portion of rotary hub 66. Rotary hub 66 consists of a rotatable, cylindrical reel hub 96 as it is removably retained within a cylindrical block 98 which allows concentric movement relative to an inner brush hub 100. Each of the A-C leads 86 emerging from conduit 84 is secured to the stationary brush hub 100, and each of the A-C wires of extension cord 64 is connected to a respective terminal on the outer reel hub 96 which rotates with the extension cord 64 as it is retracted or extended from guide slot 72 through plug recess 74. Thus, the rotary hub 96 and stationary brush hub 100 provide brush contact (in this case three brushes) to maintain continuity between the three wires of extension cord 64 and the receptacles 80 and 82. The cylindrical block 98 supports the rotary hub 96 therein and, while not specifically shown, the cylindrical support 98 and conduit 84 are closed over or isolated from the interior 56 of the tool box thereby to prevent any interference from loose objects within the tool box.

Referring again to FIG. 3, the reel of extension cord 64 as positioned between vertical panels 63 and 65, is secured in successive wraps around the outer circumfery of the rotary hub 96 which extends through the space between vertical panels 63 and 65 and also beyond panel 63 to the interior space occupied by the cylindrical support block 98 (FIG. 2). A flat reel crank 102 is releasibly secured to the axis of rotary hub 96 in accordance with the positioning of a crank handle 104. Thus, the crank handle 104 can be twisted inward into lock position so that reel crank 102 remains stationary to lock the rotary hub 96 in position and, accordingly, to lock the extension cord 64 in whatever its payed out extension. By moving the crank handle 104 outward to the position as shown in FIG. 3, the reel crank 102 is free to be rotated thereby to control rotary hub 96, i.e., to control reel movement in accordance with reel crank 102 rotation.

When the lid 12 is raised from the bottom container 14, the enlarged upper shoulder 76 is adapted to support a tray 106, as shown in FIGS. 4 and 5. The tray 106 is constructed or formed of particular peripheral configuration so that it can be seated within the enlarged shoulder 76 securely but in non-interfering relationship to the reel compartment 56 and receptacle compartments 74 and 79. Thus, the tray is formed as a flat bottomed tray with an end wall 108 for seating in upper shoulder 76 adjacent end wall 22 and a sidewall 110 for seating adjacent the side wall 16. The tray has a flat bottom 112 and a second end wall 114 for seating adjacent end wall 20 which contains the plug and receptacle compartments. Finally, a configured second side wall 116 includes narrowing component parts 118 and 120 for suitable seating adjacent compartment 56 and plug recess 74.

The tray 106 may be of uniform depth and including an angled partition 122 which forms a space 124 that may accommodate a plurality of wrench sockets varying for example from smaller to larger diametric sizes. A tray handle 126 is also formed to extend centrally from first end 108 to narrower second end 114 in balanced relationship. A handle or gripping position is formed centrally by a bend or depression 128 which also serves to accommodate the handle recess 38 (see FIG. 2) when the tool box 10 is in the closed position.

The foregoing discloses a novel form of tool box that is capable of transporting a large number of manual or small power tools while at the same time providing a retractable electrical extension cord assembly that, in effect, places a plural receptacle power source at the user's tool box, a position closest to the job at hand. A tool box constructed in accordance with the present invention is easily manufactured from available plastics using state of the art molding and formation techniques. Thus, such a tool box can be constructed with minimal moving parts or necessarily secured components while still retaining the advantageous combinative qualities wherein the retractable electrical extension cord is provided. Also in the combination scheme are the inclusion of embossed or debossed metric and inch ruler configurations as well as cup holders and various panel strengthening and related attributes.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A tool box for transport and storage of hand tools, comprising:
    a bottom portion of rectangular shape having front and back long walls, bottom, and first and second side walls;
    a lid of rectangular shape hingedly affixed to close over said bottom portion;
    a reel compartment formed in one corner of said bottom portion and consisting of a vertical panel formed adjacent and parallel to one of said long walls and perpendicular to an adjoining side wall;
    a rotary hub secured in the reel compartment between said vertical panel and the adjacent long wall;
    an A-C receptacle secured in said adjoining side wall; and
    an electrical cord with plug connected to said A-C receptacle and stored around said rotary hub to allow withdrawal of the electrical cord and plug to a selected length.

2. A tool box as set forth in claim 1 wherein said rotary hub means comprises:

brush means for maintaining electrical continuity between the electrical cord and said A-C receptacle means.

3. A tool box as set forth in claim 2 which is further characterized to include:

at least one cup-retaining indention formed in the lid.

4. A tool box as set forth in claim 2 which is further characterized to include:

a ruling scale of selected measuring standard debossed on said lid and extending parallel to a long wall.

5. A tool box as set forth in claim 1 which is further characterized to include:

an outward extending, peripheral shoulder formed around the upper part of said bottom portion; and a generally flat tray having dimensions similar to said bottom portion, said tray being seated down in the bottom portion on said shoulder.

6. A tool box as set forth in claim 1 wherein said rotatable hub comprises:

a stationary brush hub having first plural brushes and being electrically connected to said A-C receptacle; and a rotary hub rotationally disposed around said brush hub and having second plural brushes in contact with respective first plural brushes, said electrical cord being wound around said rotary hub and connected to said second plural brushes.

7. A tool box as set forth in claim 6 which is further characterized to include:

at least one cup-retaining indention formed in the lid.

8. A tool box as set forth in claim 6 which is further characterized to include:

a ruling scale of selected measuring standard debossed on said lid and extending parallel to a long wall.

9. A tool box as set forth in claim 6 which is further characterized to include:

an outward extending, peripheral shoulder formed around the upper part of said bottom portion; and a generally flat tray having dimensions similar to said bottom portion, said tray being seated down in the bottom portion on said shoulder.

* * * * *